United States Patent
Wada et al.

(10) Patent No.: US 7,193,348 B2
(45) Date of Patent: Mar. 20, 2007

(54) ROTARY ELECTRIC MACHINE

(75) Inventors: Hitoshi Wada, Fuwa-gun (JP); Hiroaki Ishikawa, Nagoya (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/223,103

(22) Filed: Sep. 12, 2005

(65) Prior Publication Data

US 2006/0006756 A1    Jan. 12, 2006

Related U.S. Application Data

(62) Division of application No. 10/600,353, filed on Jun. 23, 2003, now Pat. No. 6,998,749.

(30) Foreign Application Priority Data

Jul. 11, 2002   (JP) .............................. 2002-202073

(51) Int. Cl.
   *H02K 19/22*   (2006.01)
   *H02K 3/12*    (2006.01)
(52) U.S. Cl. .................. 310/184; 310/180; 310/198; 310/201
(58) Field of Classification Search .................. None
   See application file for complete search history.

(56) References Cited

U.S. PATENT DOCUMENTS

| | | | |
|---|---|---|---|
| 3,014,139 A * | 12/1961 | Shildneck | ............... 310/64 |
| 5,708,316 A | 1/1998 | Ishida | |
| 5,936,326 A | 8/1999 | Umeda et al. | |
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |

(Continued)

FOREIGN PATENT DOCUMENTS

EP    0 881 744 A2    12/1998

(Continued)

OTHER PUBLICATIONS

Prior product sold in U.S. before Jun. 23, 2002.

*Primary Examiner*—Burton Mullins
(74) *Attorney, Agent, or Firm*—Oliff & Berridge PLC

(57) ABSTRACT

In a vehicular alternator, a stator is arranged to oppose a rotor in a housing. The stator includes a stator core, which forms a plurality of slots extending in an axial direction of the stator core, and a stator winding wound around the stator core. The stator winding includes electric conductors held in the slots. Each of the electric conductors has a circumferential width that is smaller than a circumferential distance between a first wall and a second wall defining the slot. The first wall and the second wall oppose each other in a circumferential direction. The electric conductors are alternately in contact with one of the first wall and the second wall.

5 Claims, 4 Drawing Sheets

U.S. PATENT DOCUMENTS

| | | |
|---|---|---|
| 6,091,169 A | 7/2000 | Umeda et al. |
| 6,097,130 A | 8/2000 | Umeda et al. |
| 6,124,660 A | 9/2000 | Umeda et al. |
| 6,137,201 A | 10/2000 | Umeda et al. |
| 6,144,136 A | 11/2000 | Umeda et al. |
| 6,181,043 B1 | 1/2001 | Kusase et al. |
| 6,181,045 B1 | 1/2001 | Umeda et al. |
| 6,198,190 B1 | 3/2001 | Umeda et al. |
| 6,211,594 B1 | 4/2001 | Umeda et al. |
| 6,291,918 B1 | 9/2001 | Umeda et al. |
| 6,313,559 B1 * | 11/2001 | Kusase et al. ............... 310/254 |
| 6,448,681 B1 * | 9/2002 | Matsunaga et al. ......... 310/179 |
| 6,459,186 B1 | 10/2002 | Umeda et al. |
| 6,548,933 B2 | 4/2003 | Yasuhara et al. |
| 6,700,282 B2 | 3/2004 | Mori et al. |
| 6,713,928 B2 | 3/2004 | Takizawa et al. |
| 2001/0011852 A1 | 8/2001 | Nakamura et al. |

FOREIGN PATENT DOCUMENTS

| | | |
|---|---|---|
| JP | A-59-136039 | 8/1984 |
| JP | A-9-285046 | 10/1997 |
| JP | A-9-285052 | 10/1997 |
| JP | A-2000-197296 | 7/2000 |
| KR | 1998-87306 | 12/1998 |

* cited by examiner

ROTARY ELECTRIC MACHINE

This is a Division of application Ser. No. 10/600,353 filed Jun. 23, 2003 now U.S. Pat. No. 6,998,749. The entire disclosure of the prior application is hereby incorporated by reference herein in its entirety.

CROSS REFERENCE TO RELATED APPLICATION

This application is based on Japanese Patent Application No. 2002-202073 filed on Jul. 11, 2002, the disclosure of which is incorporated herein by reference.

FIELD OF THE INVENTION

The present invention relates to a rotary electric machine such as a vehicular alternator mounted on passenger vehicles or trucks.

BACKGROUND OF THE INVENTION

In a vehicular alternator disclosed in JP-B2-2927288 (U.S. Pat. No. 5,998,903), a winding of a stator is constructed of a plurality of U-shaped conductor segments. The U-shaped conductor segments are inserted in slots of a stator core from an axial end of the stator core. Ends of the U-shaped conductor segments are connected at an opposite axial end of the stator core.

In this kind of stator core, small gaps are required between the conductor segments and inside walls defining the slots to reduce resistance therebetween at the time of installation of the conductor segments. However, if the conductor segments are arranged in the slots without any limitations, the conductor segments are less likely to make contact with the inside walls, or likely to lean against and contact only one side of the inside walls.

In the case that the conductor segments do not make contact with the inside walls of the slots, efficiency of heat transfer from the conductor segments to the stator core decreases, so temperature of the conductor segments increases. As a result, it is likely that power output will decrease. On the contrary, in the case that the conductor segments lean to one side and contact only one of the inside walls, teeth of the stator core, on which the conductor segments are not leant, easily vibrates. As a result, magnetic noise increases due to an increase in magnetic vibrations.

SUMMARY OF THE INVENTION

The present invention is made in view of the foregoing matter and it is an object of the present invention to provide a rotary electric machine capable of improving its power output in accordance with temperature decrease and reducing magnetic noise.

According to the present invention, a rotary electric machine includes a rotor, a stator core disposed to oppose the rotor, and a stator winding wound around the stator core. The stator core is formed with a plurality of slots extending in an axial direction. Each of the slots is defined with a first wall and a second wall opposing each other in a circumferential direction. The stator winding includes insertion portions held in the slots. Each of the insertion portions has a circumferential width smaller than a distance between the first wall and the second wall of the slot. The insertion portion is disposed to make contact with one of the first wall and the second wall.

Since the width of the insertion portion is smaller than the distance between the first wall and the second wall of the slot, a gap is formed between the insertion portion and one of the first wall and the second wall. Therefore, it is easy to insert the insertion portion in the slot. Further, since the insertion portion makes contact with one of the first wall and the second wall, heat generated in the stator winding is transferred to the stator core. Therefore, temperature of the stator winding decreases. Accordingly, power output of the rotary electric machine improves. Also, vibrations of teeth reduce.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

The rotary electric machine of the present invention is for example applied to a three-phase vehicular alternator that is mounted and fixed on an engine and driven by the engine. An embodiment of the vehicular alternator in which the present invention is applied will be described in detail with reference to the drawings.

Figure 1:
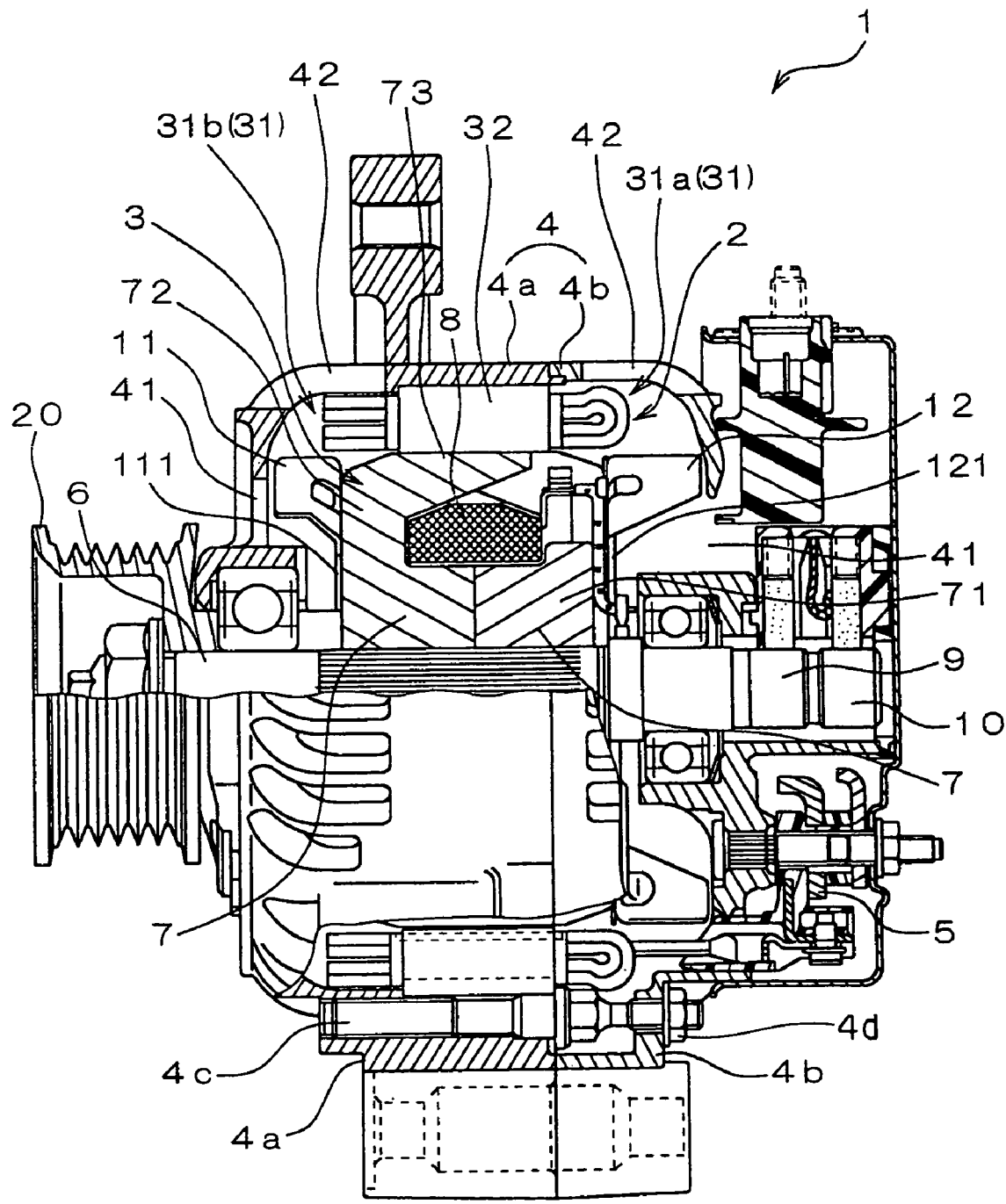
FIG. 1 is a schematic view of a vehicular alternator, partly includes a cross-section, according to the embodiment of the present invention.

As shown in FIG. 1, the vehicular alternator 1 of the embodiment includes a stator 2 functioning as an armature, a rotor 3 functioning as a field magnet, a housing 4 having a front housing 4a and a rear housing 4b, and a rectifier 5. The front housing 4a and the rear housing 4b hold the stator 2 by a stud bolt 4c and rotatably support the rotor 3. The rectifier 5 rectifies an AC voltage output from the stator 2 to a DC voltage.

The rotor 3 rotates with a shaft 6. The rotor 3 includes a Lundell-type pole core 7, a field coil 8, slip rings 9, 10, a mixed flow fan 11, and a centrifugal fan 12 as air blowing devices. The shaft 6 is connected to a pulley 20 and rotated by an onboard engine (not shown) for driving a vehicle.

The Lundell-type pole core 7 is constructed of a pair of pole cores. The Lundell-type pole core 7 includes a boss portion 71, which is fixed to the shaft 6, disc portions 72, which extend from the ends of the boss portion 71 in a radial direction, and sixteen claw poles 73.

The mixed flow fan 11, which is adjacent to the pulley 20, includes blades that are arranged at acute angles and blades that are arranged at right angles to a base plate 111. The base plate 11a is fixed to an end surface of the pole core 7 such as by welding. The mixed flow fan 11 rotates with the rotor 3. The centrifugal fan 12, which is further from the pulley 20 than the mixed flow fan 11, includes blades that are arranged at right angles to a base plate 121. The base plate 12a is fixed to an end surface of the pole core 7 such as by welding.

A housing 4 forms air inlet holes 41 on its axial end surfaces. Also, the housing 4 forms cooling air outlet holes 42 on its shoulder portions corresponding to the radially outer peripheries of a first coil ends 31a and a second coil ends 31b of the stator 2.

The rectifier 5 is fixed to the end of the vehicular alternator 1 on a side opposite to the pulley 20. The first coil end 31a is arranged to correspond to the rectifier 5.

The stator 2 includes a stator core 32, a stator winding 31, and insulators 34. The stator winding 31 is constructed of a plurality of electric conductors held in slots formed on the stator core 32. The insulators 34 provide electrical insulation between the stator core 32 and the stator winding 31. The stator core 32 is fixed by the stud bolt 4c after inserted in the front housing 4a. The rear housing 4b is placed on the stator core 32 and fixed by a nut 4d.

Figure 2:
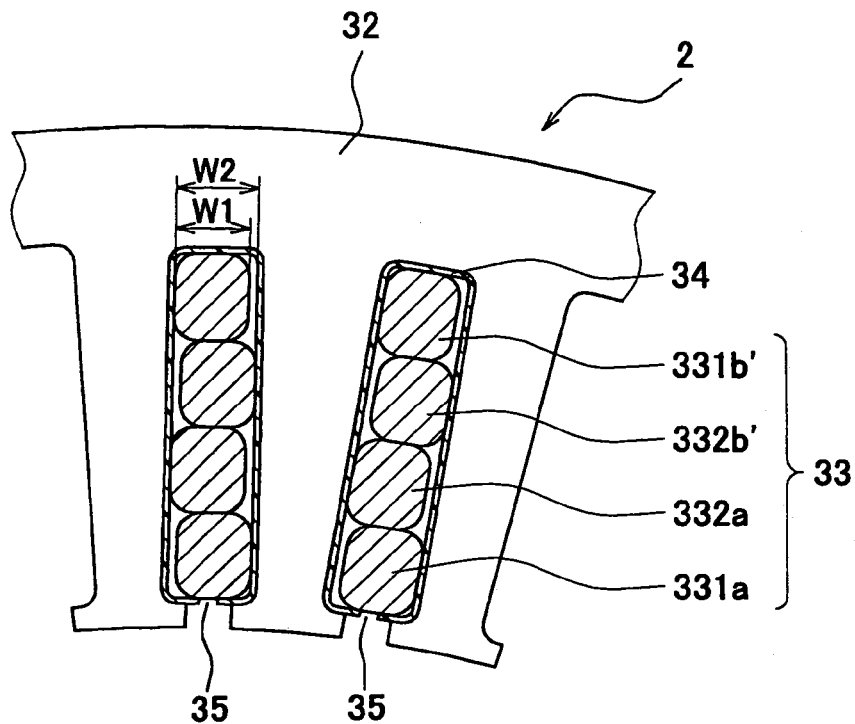
FIG. 2 is a cross-sectional view of a part of a stator core for showing arrangement of conductor segments held in slots according to the embodiment of the present invention.

As shown in FIG. 2, the stator core 32 is formed with the plurality of slots 35 in which the multi-phase stator winding 31 is held. In the embodiment, seventy-two slots 35, corresponding to the number of the poles of the rotor 3, are arranged at regular intervals for holding the three-phase stator winding 31.

The stator winding 31 can be grasped as a group of electric conductors. Even numbered electric conductors are held in each of the slots 35. For example, four electric conductors are held in each slot 35, as shown in FIG. 2.

The slot 35 extends in an axial direction of the stator core 32a. The electric conductors are arranged parallel in the axial direction of the stator core 32. As shown in FIG. 2, the four electric conductors (insertion portions) are arranged in line in order of inner end layer, inner middle layer, outer middle layer, and outer end layer from the inner diameter side with respect to a radial direction of the stator core 32.

Each of the electric conductors has a circumferential width (W1) that is smaller than a slot width (W2) of the slot 35, so that there is a gap between the electric conductor and an inside wall defining the slot 35 when the electric conductor is inserted in the slot 35. Here, the circumferential width (W1) of the electric conductor (insertion portion) is a dimension of the electric conductor in the circumferential direction of the stator core 32. The slot width (W2) is a distance between a first inside wall and a second inside wall defining the slot. The first inside wall and the second inside wall oppose in the circumferential direction.

The electric conductors are connected in predetermined patterns, thereby constructing the stator winding 31. First ends of the electric conductors are connected through continuous turn portions on a side of the first coil end 31a and second ends of the electric conductors are joined on a side of the second coil end 31b.

One electric conductor in one slot, 35 pairs up with another electric conductor in another slot 35 that is a predetermined pole-pitch away. Specially, an electric conductor of a specific layer in the slot 35 pairs up with an electric conductor of another layer in another slot 35 that is a predetermined pole-pitch away, in order to maintain gaps between the plurality of electric conductors at the coil ends and arrange them orderly.

For example, an electric conductor 331a of the inner end layer in the first slot 35 pairs up with an electric conductor 331b of the outer end layer in the second slot 35 that is one pole-pitch away in the clockwise direction of the stator core 32. Likewise, an electric conductor 332a of the inner middle layer in the first slot 35 pairs up with an electric conductor 332b of the outer middle layer in the second slot 35 that is one pole-pitch away in the clockwise direction of the stator core 32.

The paired electric conductors 331a, 331b, and the paired electric conductors 332a, 332b are respectively connected through turn portions 331c, 332c at one of the axial ends of the stator core 32. Therefore, the turn portion 332c, which connects the electric conductor 332b of the outer middle layer and the electric conductor 332a of the inner middle layer, is surrounded by the turn portion 331c, which connects the electric conductor 331b of the outer end layer and the electric conductor 331a of the inner end layer, at one of the axial ends of the stator core 32.

A middle layer coil end is formed by connections of the electric conductors of the outer middle layers and the electric conductors of the inner middle layers. An outer layer coil end is formed by connections of the electric conductors of the outer end layers and the electric conductors of the inner end layers.

On the other hand, the electric conductor 332a of the inner middle layer in the first slot 35 also pairs up with an electric conductor 331a' of the inner end layer in the second slot 35 that is one pole-pitch away in the clockwise direction of the stator core 32. Likewise, an electric conductor 331b' of the outer end layer in the first slot 35 pairs up with the electric conductor 332b of the outer middle layer in the second slot 35. These electric conductors are connected together at the opposite axial end of the stator core 32 by welding.

Therefore, at the opposite axial end of the stator core 32, a connecting portion of the electric conductor of the outer end layer and the electric conductor of the outer middle layer and a connecting portion of the electric conductor of the inner end layer and the electric conductor of the inner middle layer are arranged in the radial direction of the stator core 32.

Adjacent layer coil ends are formed by connections of the electric conductors 331b of the outer end layers and the electric conductors 332b of the outer middle layers and connections of the electric conductors 331a of the inner end layers and the electric conductors 332a of the inner middle layers. In this way, at the opposite axial end of the stator core 32, the connecting portions of the paired electric conductors are arranged without overlapping.

The electric conductors are provided from U-shaped conductor segments that are produced by forming electric wires into predetermined shapes. The electric wire has a constant thickness and substantially rectangular-shaped cross-sections. Thus, each of the electric conductors has a first surface and a second surface. The first surface and the second surface are opposite to each other and face the first and the second inside walls of the slot 35, respectively.

Figure 3:
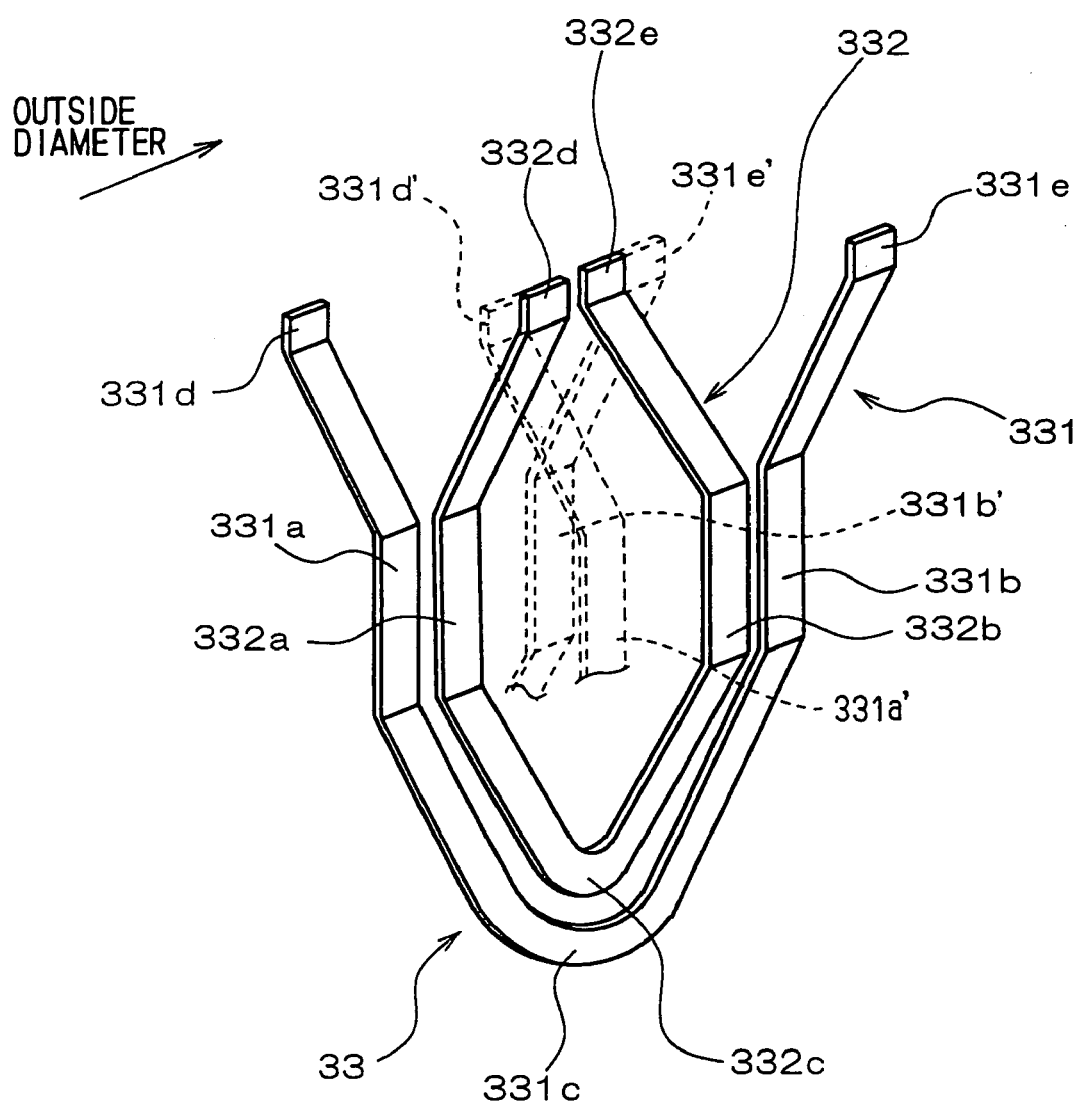
FIG. 3 is a perspective view of the conductor segments constructing a stator winding according to the embodiment of the present invention.

As shown in FIG. 3, the electric conductor 331a of the inner end layer and the electric conductor 331b of the outer end layer are included in a large conductor segment 331. The electric conductor 332a of the inner middle layer and the electric conductor 332b of the outer middle layer are included in a small segment 332. The large conductor segment 331 and the small conductor segment 332 have substantially U-shape.

The large segment 331 and the small segment 332 are included in the base conductor segments 33. The base conductor segments 33 are arranged regularly in the slots 35 so that a coil that turns twice around the stator core 32 is constructed. However, the conductor segments that include lead-out wires of the stator winding and turn portions connecting the first and the second laps are constructed of special shape conductor segments, which are in different shape from the base conductor segments 33.

In this embodiment, nine special shape conductor segments are provided. The connection between the first and the second laps is made by the connection between the electric conductors of the end layer and the middle layer. By this connection, special shape coil ends are formed.

In the large conductor segment 331, an inside distance between the electric conductor (straight portion) 331b of the outer end layer and the electric conductor (straight portion) 331a of the inner end layer of the large conductor segment 331 in the circumferential direction of the stator core 32 is slightly shorter than a central pitch P (FIG. 4) between central points of the first and second slots 35 in which the electric conductor 331b and 331a are held, in the circumferential direction.

The inside distance between the pair of straight portions 331b, 331a is variable by resilient deformation of the turn portion 331c. The straight portions 331a, 331b are inserted in the first slot and the second slot 35 while expanding the inside distance between the straight portions 331b, 331a. As a result, the electric conductors 331b, 331a contact the inside walls of the slots 35 on sides adjacent to the turn portions 331c and are spaced from the opposite inside walls that are on the sides opposite to the turn portions 331c, by spring back of the resilient deformation.

In the small conductor segment 332, an inside distance between the electric conductor 332b of the outer middle layer and the electric conductor 332a of the inner middle layer of the small conductor segment 332 in the circumferential direction is slightly longer than the central pitch P between the central points of the first and the second slots 35 in which the electric conductors 332b, 332a are held.

The inside distance between the pair of straight portions 332b, 332a is variable by resilient deformation of the turn portion 332c. The straight portions 332a, 332b are inserted in the first and second slots 35 while decreasing the inside distance between the straight portions 332b, 332a. As a result, the straight portions 332b, 332a are held in the respective slots 35 such that the straight portions 332b, 332a are in contact with the inside walls of the slots 35 that are on the sides opposite to the turn portion 331c and spaced from the opposite inside walls of the slots 35 that are on the side adjacent to the turn portion 332c.

In this way, the large conductor segment 331 and the small conductor segment 332 are held such that the straight portions 331a, 331b of the large conductor segment 331 are arranged to be close to each other and the straight portions 332a, 332b of the small conductor segment 332 are arranged to separate from each other, with respect to the central pitch P.

Therefore, as shown in FIG. 2, in the slot 35, the straight portions of the large conductor segments 331 and the small conductor segment 332 are arranged in line in the radial direction of the stator core 32. Further, the straight portions are alternately in contact with the first inside wall and the second inside wall of the slot 35.

Next, a process of manufacturing the stator winding 31 will be described. First, the base segments 33 are arranged such that the turn portion 332c of the small conductor segment 332 is surrounded by the turn portion 331c of the large conductor segment 331 and inserted in the stator core 32 from one of the axial ends in the above-described manner.

Thus, the electric conductor 331a, which is one of the straight portions of the large segment 331, is inserted in the inner end layer in the first slot 35 of the stator core 32. The electric conductor 332a, which is one of the straight portions of the small segment 332, is inserted in the inner middle layer 32 of the first slot 35. The electric conductor 331b, which is the remaining straight portion of the large segment 331, is inserted in the outer end layer of the second slot 35. The electric conductor 332b, which is the remaining straight portion of the small segment 332, is inserted in the outer middle layer in the second slot 35.

As a result, the electric conductors 331a, 332a, 332b', 331b' are arranged in line in the slot 35 in this order from the inner end layer in the radial direction, as shown in FIG. 2. Here, the straight portions 332b', 331b' are paired up with the electric conductors in a slot 35 that is one-pole pitch away from the first slot.

After inserted, in the second coil end 31b, joining portions 331d, 331e of the electric conductors 331a, 331b of the end layers are tilted for one and a half slots in the direction that the large conductor segment 331 opens. Joining portions 332d, 332e of the electric conductors 332a, 332b in the middle layers are tilted for one and a half slots in the direction that the small conductor segment 332 closes.

Figure 4:
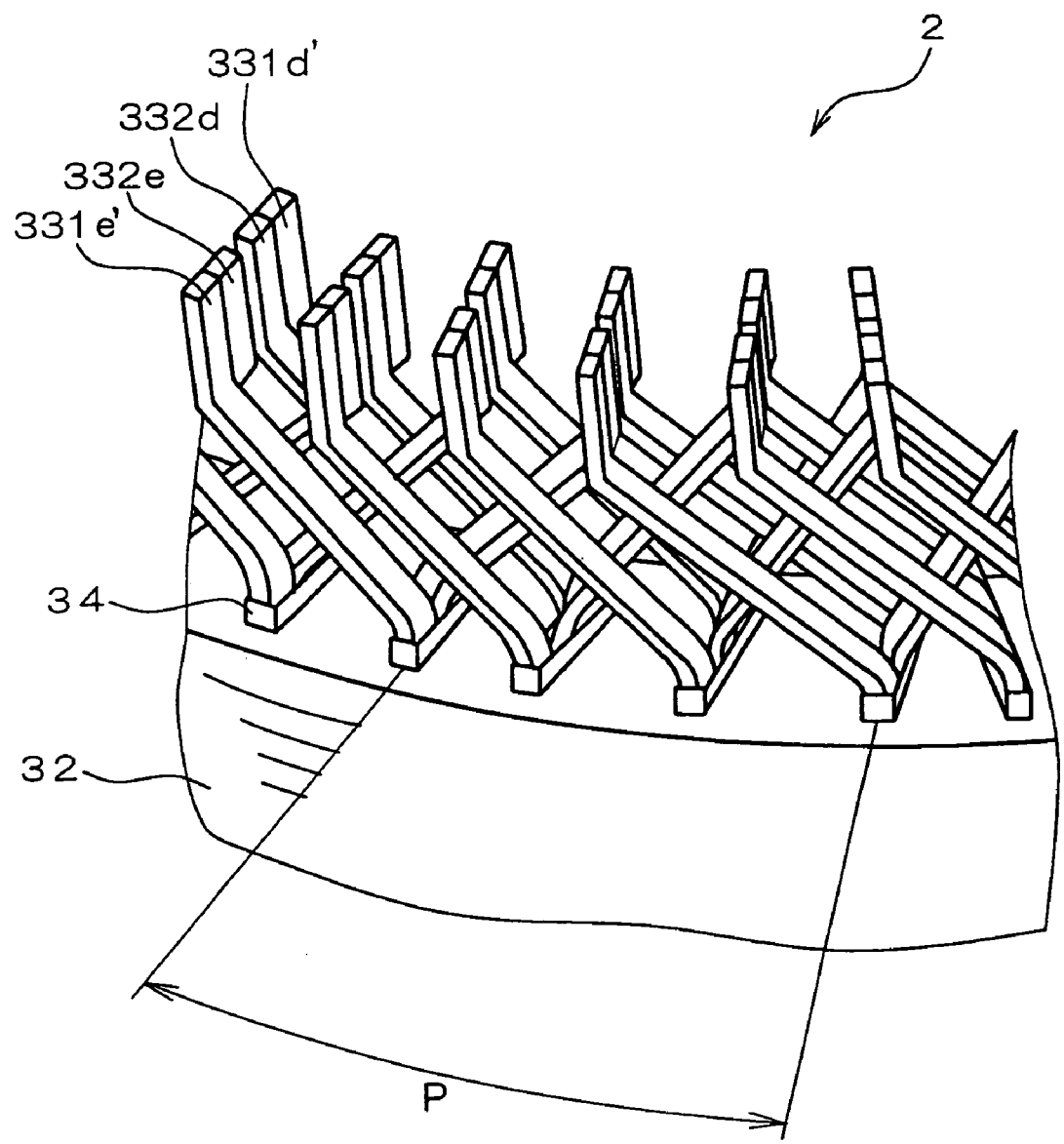
FIG. 4 is a perspective view of joining portions of the conductor segments according to the embodiment of the present invention.

This step is repeated for all base conductor segments in the slots 35. Then, in the second coil end 31b, the joining portion 331e' of the outer end layer and the joining portion 332e of the outer middle layer are joined by welding, such as ultrasonic welding, arc welding and brazing, and by other method, to have electrical continuity. The joining portion 332d of the inner middle layer and the joining portion 331d' of the inner end layer are joined in the similar manner. In this way, the stator 2 shown in FIG. 4 is produced.

In the vehicular alternator 1 of the embodiment, since the circumferential width (W1) of the electric conductors (insertion portions) is smaller than the slot width (W2), the gap is formed between the electric conductor and one of the first inside wall and the second inside wall of the slot 35. Therefore, it is easy to insert the conductor segments 33 in the slots 35. With this, workability improves.

Also, since the electric conductor is in contact with one of the first inside wall and the second inside wall of the slot 35, heat of the stator winding 31 is effectively transferred to the inside wall of the slot 35. Therefore, temperature of the stator winding 31 decreases, resulting in an improvement of power output.

The electric conductor of the conductor segment 33 has substantially a rectangular-shaped cross-section to correspond to the shape of the slot 35. Therefore, contact surface area between the inside wall of the slot 35 and the electric conductor increases, so the efficiency of heat transfer improves. Also, the electric conductor is less likely to vibrate. As a result, magnetic noise of the stator winding 31 reduces.

In the slot 35, a plurality of electric conductors is arranged in line in the radial direction. Further, the electric conductors alternately contact the first inside wall and the second inside wall of the slot. Therefore, the electric conductors make contacts with the inside walls of the slots equally. With this, heat of the stator winding 31 is uniformly transferred to the inside walls of the slots. Further, it is possible to equally limit the teeth of the stator core 32 from vibrating.

Further, the electric conductors are in contact with the inside walls of the slots 35 by the spring back of the turn portions 331c, 332c of the conductor segments 33. Therefore, it is not required to add specific parts and process to make the electric conductors contact the inside walls of the slots 35. Accordingly, the power output improvement in accordance with the temperature decrease and the reduction of magnetic noise are achieved with the simple structure.

Further, forming the stator winding with the conductor segments easily increases thickness of the stator winding. With this, it is possible to further decrease the temperature in accordance with a decrease in resistance. Also, power output further improves and magnetic noise further reduces in accordance with an increase in rigidity.

Figure 5:
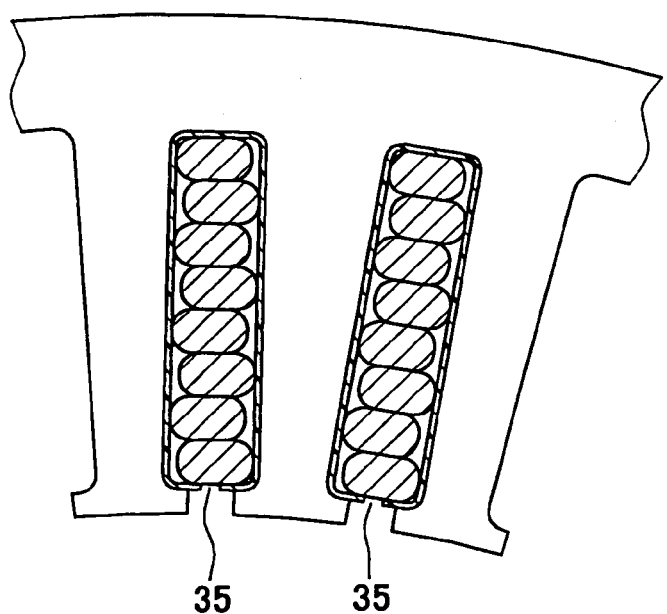
FIG. 5 is a cross-sectional view of a part of the stator core for showing arrangement of the conductor segments of a modified embodiment of the present invention.

In the above embodiment, four electric conductors are held in each slot 35. Instead, eight electric conductors can be arranged in line in the radial direction in the slot 35, for example. As shown in FIG. 5, the eight electric conductors are alternately in contact with the first inside wall and the second inside wall of the slot 35.

In the above-described embodiment, the stator winding 31 is constructed by using the U-shaped conductor segments. The present invention can be employed to a stator winding that is constructed by substantially straight conductor segments without having turn portions and by a continuous wire.

The present invention can be employed to various kinds of rotary electric machines, such as other kinds of generators or motors other than the generators.

The present invention should not be limited to the disclosed embodiments, but may be implemented in other ways without departing from the spirit of the invention.

What is claimed is:

1. A rotary electric machine, comprising:

a rotor;

a stator core disposed to oppose the rotor, wherein the stator core is formed with a plurality of slots extending in an axial direction, and each of the slots is defined with a first wall and a second wall that oppose each other in a circumferential direction; and a stator winding wound around the stator core, wherein the stator winding is a continuous winding, the stator winding includes insertion portions held in the slots, each of the insertion portions has a cirumferential width that is smaller than a distance between the first wall and the second wall of the slot, one of the insertion portions contacts the first wall of the slot through an insulator, another one of the insertion portions contacts the second wall of the slot through the insulator, and the insertion portions alternately contact the first wall and the second wall.

2. The rotary electric machine according to claim 1, wherein an even number of insertion portions is inserted into each slot, half of the insertion portions contact the first wall of the slot, and the remaining half of the insertion portions contact the second wall of the slot.

3. The rotary electric machine according to claim 2, wherein the insertion portions contact the walls of the slot through the insulator by coil spring back.

4. The rotary electric machine according to claim 1, wherein the insertion portions contact the walls of the slot through the insulator by coil spring back.

5. The rotary electric machine according to claim 1, wherein the insertion portions are arranged in a row such that each insertion portion contacts one of the first and second walls through the insulator.

* * * * *